(12) United States Patent
Harrison et al.

(10) Patent No.: US 10,068,473 B1
(45) Date of Patent: Sep. 4, 2018

(54) METHOD AND APPARATUS FOR PROVIDING A PROXIMITY ALERT TO THE OPERATOR OF A VEHICLE

(71) Applicants: Michael A. Harrison, Santa Rosa, CA (US); Dave Michaelson, Santa Rosa, CA (US)

(72) Inventors: Michael A. Harrison, Santa Rosa, CA (US); Dave Michaelson, Santa Rosa, CA (US)

(*) Notice: Subject to any disclaimer, the term of this patent is extended or adjusted under 35 U.S.C. 154(b) by 0 days.

(21) Appl. No.: 15/407,310

(22) Filed: Jan. 17, 2017

Related U.S. Application Data

(60) Provisional application No. 62/278,735, filed on Jan. 14, 2016.

(51) Int. Cl.
| | |
|---|---|
| *G08G 1/09* | (2006.01) |
| *G08G 1/0967* | (2006.01) |
| *G08G 1/16* | (2006.01) |
| *H04W 4/00* | (2018.01) |
| *G08G 1/0965* | (2006.01) |
| *H04W 4/80* | (2018.01) |

(52) U.S. Cl.
CPC ..... *G08G 1/096783* (2013.01); *G08G 1/0965* (2013.01); *G08G 1/165* (2013.01); *G08G 1/166* (2013.01); *H04W 4/008* (2013.01); *H04W 4/80* (2018.02)

(58) Field of Classification Search
CPC ....... H04W 4/046; H04W 4/80; H04W 4/008; G01C 21/3492; G01C 21/3461; G01C 21/34; G01C 21/26; G08G 1/0962–1/0968; G08G 1/165; G08G 1/166; G07B 15/063

USPC .................. 340/901–905, 435; 701/400, 117
See application file for complete search history.

(56) References Cited

U.S. PATENT DOCUMENTS

| | | | | |
|---|---|---|---|---|
| 6,384,742 | B1* | 5/2002 | Harrison | B61L 29/24 340/917 |
| 6,597,293 | B1* | 7/2003 | Harrison | B61L 29/24 340/944 |
| 9,142,127 | B1* | 9/2015 | McDevitt-Pimbley | G08G 1/091 |
| 9,153,128 | B2* | 10/2015 | Holzwanger | G08G 1/005 |
| 9,595,139 | B1* | 3/2017 | Breed | G07B 15/063 |
| 2011/0034183 | A1* | 2/2011 | Haag | G06Q 50/26 455/456.3 |
| 2013/0006724 | A1* | 1/2013 | Simanek | G06Q 30/0207 705/13 |
| 2014/0203149 | A1* | 7/2014 | Raiser | B61L 23/007 246/473.1 |

(Continued)

*Primary Examiner* — Thomas Mullen
(74) *Attorney, Agent, or Firm* — Larry D. Johnson

(57) ABSTRACT

A method and apparatus for providing a proximity alert to the operator of a vehicle, such as a vehicle approaching a pedestrian crosswalk. A fixed or mobile controller (beacon) component when activated transmits a signal relating to a potential hazard, and a software application ("app") installed on a smartphone or other device provides the receiver/notification component. The app delivers an audible, visual, and/or tactile alert to drivers via their smartphones, tablet computers, or mobile devices installed in their vehicles that they are approaching an "activated" pedestrian crosswalk, intersection, railroad crossing, road hazard or work zone, emergency vehicle, or even a bicyclist when they are equipped with a beacon.

10 Claims, 3 Drawing Sheets

(56) References Cited

U.S. PATENT DOCUMENTS

| | | | | |
|---|---|---|---|---|
| 2014/0350830 A1* | 11/2014 | David | ............... | G08G 1/0116 |
| | | | | 701/117 |
| 2015/0251599 A1* | 9/2015 | Koravadi | ............... | B60Q 9/008 |
| | | | | 340/903 |
| 2016/0055466 A1* | 2/2016 | Du | ............... | G06Q 20/145 |
| | | | | 705/13 |
| 2016/0138930 A1* | 5/2016 | Akiyama | ............... | G01C 21/3461 |
| | | | | 701/465 |
| 2016/0189444 A1* | 6/2016 | Madhok | ............... | G07C 5/02 |
| | | | | 701/36 |

* cited by examiner

METHOD AND APPARATUS FOR PROVIDING A PROXIMITY ALERT TO THE OPERATOR OF A VEHICLE

CROSS REFERENCE TO RELATED APPLICATIONS

The present application claims the benefit of the filing date of U.S. Provisional Patent Application Ser. No. 62/278,735, filed Jan. 14, 2016. The foregoing application is incorporated by reference in its entirety as if fully set forth herein.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates generally to warning and alert systems for vehicles, and more particularly to an improved method and apparatus for providing a proximity alert to the operator of a vehicle.

BACKGROUND INFORMATION AND DISCUSSION OF RELATED ART

U.S. Pat. No. 6,384,742 to Harrison discloses a traffic warning system which alerts approaching vehicle traffic to the presence of a pedestrian in a crosswalk. The system includes a plurality of surface mounted lights partially embedded in and placed across a roadway. The lights are activated by the pedestrian, either by manual switch or by a sensor, before he enters the crosswalk. Once activated, the flashing lights warn drivers of approaching vehicles that a pedestrian may have entered the crosswalk, and that caution should be exercised.

U.S. Pat. No. 6,597,293 to Harrison describes a traffic warning system which alerts approaching vehicle traffic to an intersection stop requirement. The system includes a plurality of above-pavement, surface mounted lights, installed in a fashion similar to currently used road reflectors, and which are partially embedded in a roadway and placed across the roadway, e.g., adjacent to and parallel with the existing stripes or stop bars designating an intersection, and constructed so that they are impervious to vehicle traffic over them. Once activated, the lights flash in the direction of oncoming traffic, and emanate directly from the roadway, to warn drivers of approaching vehicles that a stop may be required at the intersection, and that caution should be exercised.

U.S. Pat. No. 6,683,540 to Harrison teaches a traffic warning system which alerts approaching vehicle traffic to the approach of a train in a crossing. The system includes a plurality of surface mounted lights partially embedded in and placed across a roadway. Once activated, the flashing lights warn drivers of approaching vehicles that a train is approaching, and that caution should be exercised.

There are known cell phone applications for pedestrian safety that are designed to detect an approaching vehicle and alert a pedestrian via their cell phone. There are also applications that generate a bright blinking light on the pedestrian's cell phone that can be used to alert drivers of the presence of the pedestrian. Neither of these coordinate with a broader smart city safety initiative and are therefore impractical for mass distribution and usage.

The foregoing patents and information reflects the current state of the art of which the present inventor is aware. Reference to, and discussion of, these patents and this information is intended to aid in discharging Applicant's acknowledged duty of candor in disclosing information that may be relevant to the examination of claims to the present invention. However, it is respectfully submitted that none of the above-indicated patents or information discloses, teaches, suggests, shows, or otherwise renders obvious, either singly or when considered in combination, the invention described and claimed herein.

SUMMARY OF THE INVENTION

The present invention provides a method and apparatus for providing a proximity alert to the operator of a vehicle. One embodiment provides a system with two components, a fixed or mobile controller (beacon) component that when activated transmits a signal relating to a potential hazard, and a software application ("app") installed on a smartphone or other device as the receiver/notification component. The app delivers an audible, visual, and/or tactile alert to drivers via their smartphones, tablet computers, or mobile devices installed in their vehicles that they are approaching an "activated" pedestrian crosswalk, intersection, railroad crossing, road hazard or work zone, emergency vehicle, or even a bicyclist when they are equipped with the system's beacon. Cities, municipalities, DOT's (Departments of Transportation), emergency workers, or bicyclists can install (such as mount, or carry) this beacon into these types of locations that will then broadcast an alert via Bluetooth® to smartphones with the installed application.

The system increases the level of awareness of the motorist and will greatly increase safety for the traveling public in all these areas. Bicyclists are particularly vulnerable to injuries from accidents with motorists and can benefit from using the system to alert drivers of their presence.

For example, when a monitored pedestrian crosswalk system is activated (e.g., via manual activation by a pedestrian, via automatic activation by pedestrian detectors—infrared, motion detection, ultrasonic, pressure plate, microwave, video, etc., or via a scheduled event or time), the beacon is activated and transmits a signal, and the app on the smartphone receives the signal and alerts the operator of the approaching vehicle to the presence of a pedestrian in the crosswalk.

Different alerts may be used depending on the compass direction of the crosswalk and the approaching motorist to convey appropriate information to the motorist. Alerts may not be given if the vehicle is moving approximately away from the crosswalk (to minimize nuisance distraction). Vehicles approaching approximately perpendicular to the crosswalk compass direction may be provided with a different alert than vehicles approaching parallel to the crosswalk compass direction.

The system preferably utilizes Bluetooth 4.0 as its communications standard, and can be upgraded to other communications standards (such as Bluetooth 5.0) as they are developed. Bluetooth 4.0 provides a greater communications range than Bluetooth 3.0, a faster response (ping) rate, and requires less power than Bluetooth 3.0 devices. As a result, cell phones can enable Bluetooth 4.0 without substantial battery drain.

Bluetooth 4.0 can be utilized within products that are physically very small. This is important because in some cases the amount of physical space available to install the signal beacon in crosswalks or other locations may be quite limited. Further, Bluetooth 4.0's longer signal range makes driver alerts feasible in intersections and crosswalks such as school crossings, hospitals, and other intersections where speeds of up to about 35 MPH are permitted. Presently, the Bluetooth 4.0 system does not support intersections with traffic speeds above 35 MPH as drivers may not receive enough advance warning to slow down in time to prevent accidents. Adoption of upgraded standards such as Bluetooth 5.0 may increase this signal range.

The controllers install easily in most crosswalk systems, and can operate with or without additional crosswalk traffic alert systems. The controllers do not require the in-depth engineering and advanced installation of a crosswalk system. The system software may also be installed as an original equipment in a vehicle's dashboard alert system.

The system also provides opportunities to interface with products such as Google Maps, iPhones, Android phones, and other "smart city" products. The system can be compatible with all third-party crosswalk and intersection alert systems, meaning that the system will work with any manufacturer's products.

The system expands on installed systems and can provide safety solutions for any crosswalk or intersection whether signage, additional visible lighting, or driver alerts exist or not. This makes virtually every intersection or crosswalk domestically and abroad an opportunity for the system.

The system may incorporate GPS information available from selected devices and locations. The combination of both GPS and Bluetooth technologies increases the precision of the system but also greatly enhances the range of uses and applications. The system can be used to coordinate emergency vehicles in a city, warn drivers of other hazards such as overhead bridge/height limitations, regulate and measure traffic flows, and much more.

The system software application for cell phones can be available via downloads from the Apple and Android marketplace.

The following are examples of notifications that may be recognized and sent as alerts for the application:

EVA (Emergency Vehicle Alerts) such as Ambulance, Police and Fire on highways or approaching traffic signals, alerting the affected or nearby vehicles in that lane to pull over to allow them to pass. This could be helpful in large cities or in congested areas to assist in responding to an emergency call sooner.

Pedestrian alerts to crosswalks with beacons, and even standalone locations to crosswalks that may not have beacons of any type installed (e.g., a pole mounted push button, or automatic activation).

Railroad Crossings: Any time a train is approaching the upcoming crossing sends out a signal to be picked up by the application in advance of the crossing.

Clip-on or personally held beacons, for the purpose of identification of bicyclists, or even children walking to school (with systems to avoid too much "clutter" with trying to identify all people walking).

The system can also be used in association with in-roadway warning light (IRWL) and vehicle communication systems such as those disclosed in U.S. Pat. Nos. 6,384,742; 6,597,293; 6,683,540, the disclosures of which are incorporated by reference herein.

A further embodiment for the system is the ability to incorporate the beacon into portable message signs such as radar speed signs, "Men Working" signs, "time to destination" signs, and the like. This may include selective integration into the software, as it may not always be desirable to transmit a given message, and they will change with the sign (e.g., speeds "Your Speed . . . 42, Slow to 35" . . . etc. . . . or "Time to Destination . . . 15 Minutes"). Also, it may be appropriate to exclude some messages like "Event Parking". This may be a hardware/software design consideration, dependent on the specific message. Other messages, such as a "Children Ahead" message should ordinarily be included as an "ON" option. Implementation may include the ability to utilize file management in existing or new signage via cloud based communication.

An alternate embodiment of the system helps to alert operators of industrial equipment such as heavy machinery and vehicles such as forklifts when workers or others are at risk of being injured by being too close to operating vehicles. This industrial equipment embodiment of the system features a controller unit that mounts on vehicles with antennas and an operator display. Workers install a Bluetooth application in their cell phones or similar devices that the controller unit uses to identify them. The phones can be placed in a pocket, mounted on a belt, installed in a vest, or located anywhere that the controller is able to read the Bluetooth signal from the worker. As workers move around, their location is identified and the information is sent to the controller units mounted on vehicles. The system provides configurable features for identifying workers on the display and warns both workers and operators when there are potential safety hazards via audio and visual cautions. The combination of audio and visual warnings is needed for both noisy environments and circumstances where visibility may be limited.

Operators can also configure the system to detect overhead wires, doors, and stationary objects as well as workers. It can select "Out of bounds" areas to prevent unnecessary alarms. The system can also provide worker and utilization data for management purposes if desired.

The greater range and faster response rate of Bluetooth 4.0 also enhances this industrial equipment embodiment. With this technology, workers can transmit their locations via their cell phones or other enabled devices. This can reduce system costs but can also enable data to easily be stored in the cloud or elsewhere for future review if needed.

This embodiment of the system can be used for heavy machinery vehicles such as forklifts, dump trucks, earth movers, tractors, and other large work vehicles. These vehicles are used in construction, mining, road work, warehousing, agriculture, manufacturing, timber, military, and other markets where large work vehicles are needed. Of the hundreds of thousands of such vehicles operating in the United States, virtually none have meaningful safety solutions in place beyond audible warnings when vehicles are reversing and mirrors for the operators to see workers near the vehicle. Such minimal protections are woefully inadequate to prevent serious injuries and fatalities. When operators use heavy machinery vehicles, they frequently must look over their shoulders or rely on mirrors, which inevitably leaves blind spots around the vehicle unattended. Operators in construction zones, in roadway repairs, and in warehouses often must alternate between backing up and moving forward, potentially creating confusion among workers and increasing the likelihood of injuries. Further, on many job sites workers walk around or near the vehicles moving debris or performing other tasks. A miscommunication between workers and the operator can quickly escalate into a tragedy.

It is therefore an object of the present invention to provide a new and improved method and apparatus for providing a proximity alert to the operator of a vehicle.

It is another object of the present invention to provide a new and improved system enabling alerts relating to a potential hazard to be sent to the operator of a vehicle.

A further object or feature of the present invention is a new and improved system to alert drivers to the presence of a pedestrian in a crosswalk.

An even further object of the present invention is to provide a novel software application that delivers an audible, visual, and/or tactile alert of a potential hazard to drivers via their smartphones, tablet computers, or mobile devices installed in their vehicles.

Other novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration and description only and are not intended as a definition of the limits of the invention. The various features of novelty which characterize the invention are pointed out with particularity in the claims annexed to and forming part of this disclosure. The invention resides not in any one of these features taken alone, but rather in the particular combination of all of its structures for the functions specified.

There has thus been broadly outlined the more important features of the invention in order that the detailed description thereof that follows may be better understood, and in order that the present contribution to the art may be better appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is neither intended to define the invention of this application, which is measured by the claims, nor is it intended to be limiting as to the scope of the invention in any way.

Certain terminology and derivations thereof may be used in the following description for convenience in reference only, and will not be limiting. For example, words such as "upward," "downward," "left," and "right" would refer to directions in the drawings to which reference is made unless otherwise stated. Similarly, words such as "inward" and "outward" would refer to directions toward and away from, respectively, the geometric center of a device or area and designated parts thereof. References in the singular tense include the plural, and vice versa, unless otherwise noted.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

Figure 1:
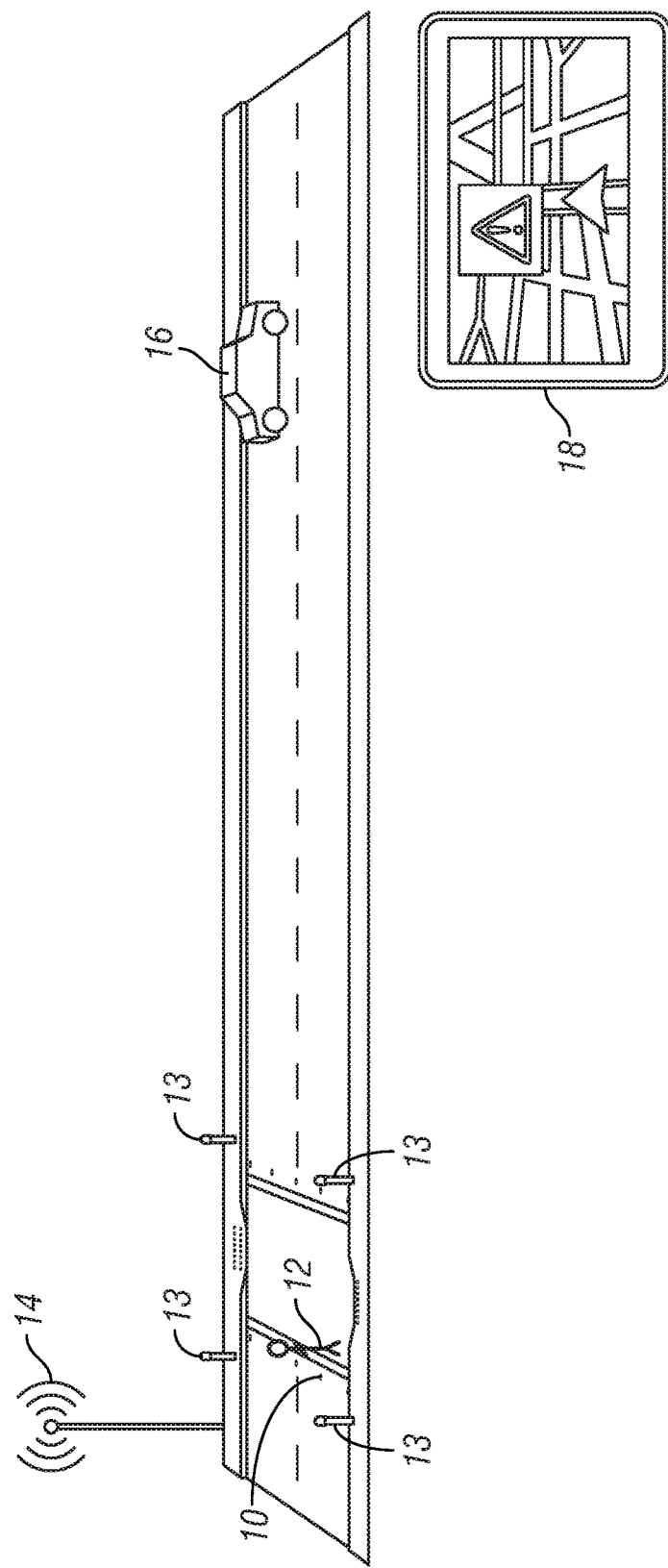
FIG. 1 is a view of a proximity alert system of this invention as installed at a "smart" pedestrian crosswalk associated with a beacon to transmit an alert to a driver with a smartphone.

FIG. 1 is a view of a proximity alert system of this invention as installed at a "smart" pedestrian activated crosswalk 10. When the crosswalk 10 is activated by a switch or sensor 13 (e.g., via manual activation by a pedestrian 12, via automatic activation by pedestrian detectors— infrared, motion detection, ultrasonic, pressure plate, microwave, video, etc., or via a scheduled event or time), the beacon 14 is activated and transmits a signal/alert notification. If a vehicle 16 is approaching the crosswalk, the installed app on the driver's smartphone 18 receives the signal and alerts the operator of the vehicle to the presence of the pedestrian in the crosswalk.

Figure 2:
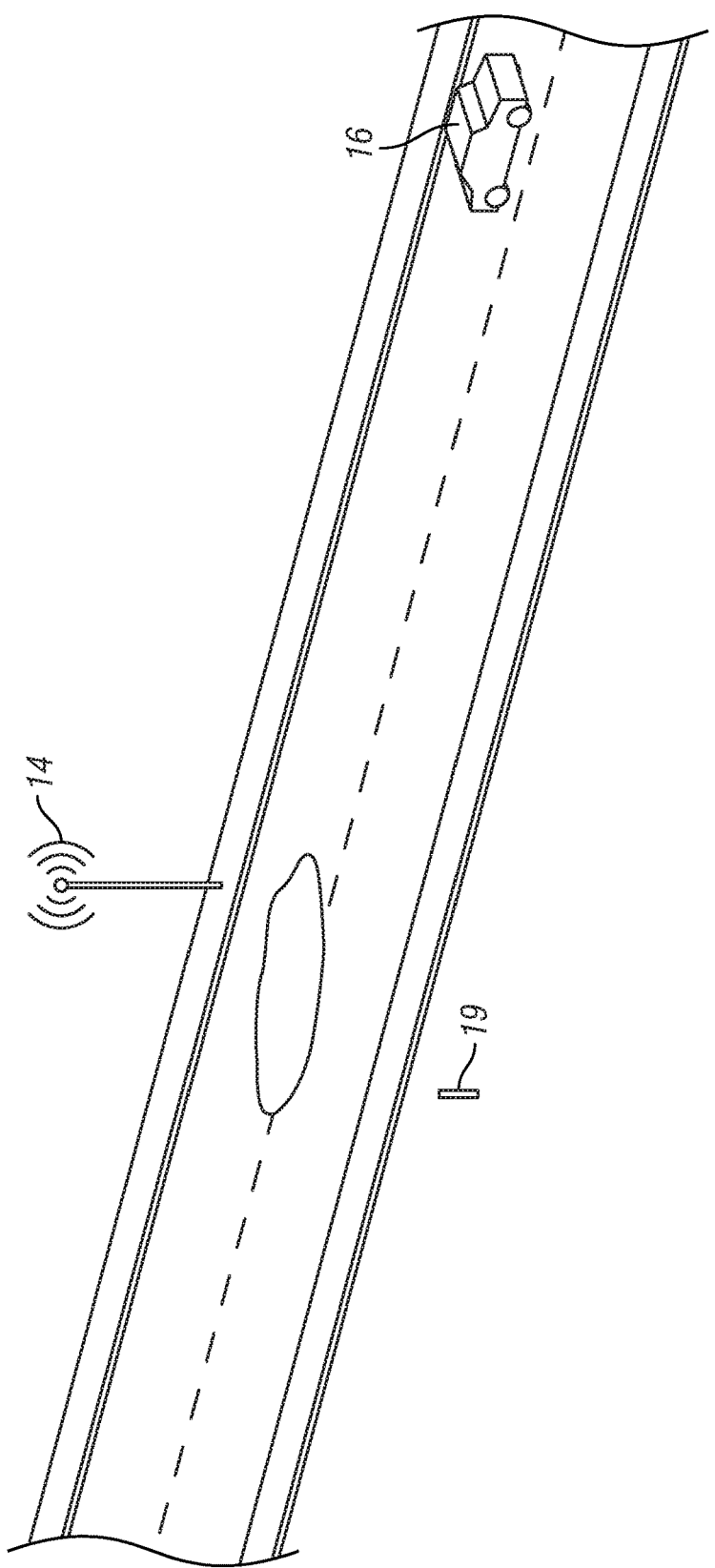
FIG. 2 is a view of an ice or flood condition sensor associated with a beacon.

FIG. 2 is a view of an ice or flood condition sensor 19 associated with a beacon 14. These roadway sensors detect icy or flooded conditions and can be strategically placed in locations along a roadway to detect high water levels in a flood-prone area or potential for ice in freezing conditions, and when such conditions are detected the sensor activates beacon 14 to transmit a signal/alert notification to an installed app on a driver's smartphone as above.

Figure 3:
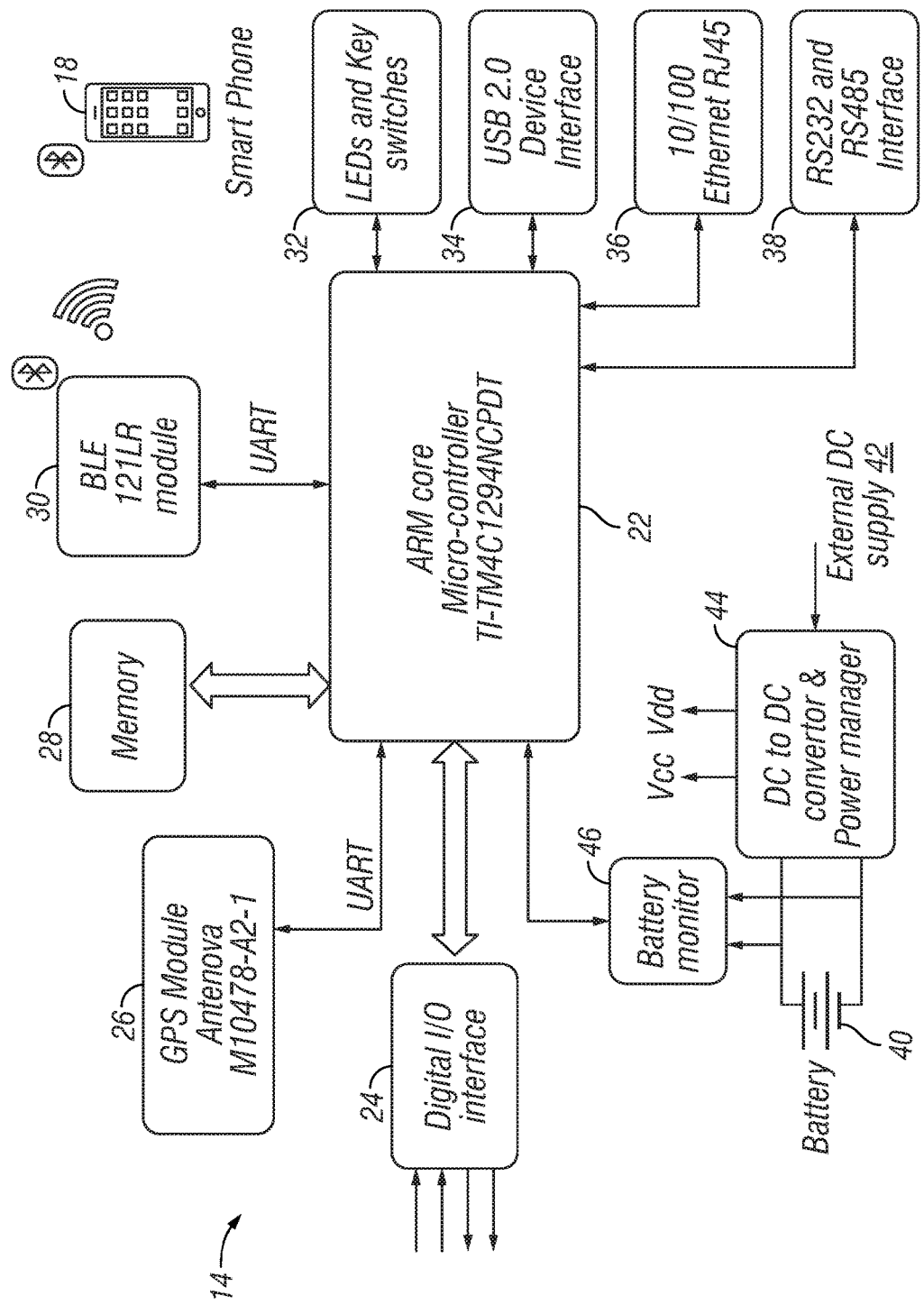
FIG. 3 is a hardware block diagram of a representative beacon.

FIG. 3 is a hardware block diagram of a beacon 14, which may include a microcontroller 22 having a digital I/O interface 24 (for crosswalks, rail crossings, toll booths, etc.), GPS module 26, memory 28, and Bluetooth module 30; and LEDs and Key switches 32, USB interface 34, Ethernet connection 36, and RS232/RS485 interface 38. Power may be supplied to all components by a battery 40 and/or external DC supply 42 via converter/power manager 44 and battery monitor 46. When the system is activated as described above, Bluetooth module 30 transmits the relevant signal to smartphone 18.

The fixed and mobile versions of the beacon may utilize similar hardware and circuitry, but may differ in their size and housings. For example, mobile beacons utilized for construction sites or road hazards my be larger than mobile beacons for bicyclists and children. The fixed versions of the beacon (such as may be used at pedestrian walkways, pedestrian crosswalks, or railroad crossings) are typically activated on demand, while the mobile versions (such as may be used by a bicyclist) are typically continuously transmitting.

The beacons may be programmed by the manufacturer, or otherwise programmed and customized by the end user for their particular situation.

A single app on a user's smartphone may be receptive to signals from any and all beacons. Updates to keep current on any new beacon installations may be provided to the user's smartphone on a regular basis.

The software application may include logic for pedestrian crosswalk beacons and applications in various situations to avoid unnecessary alerts when, e.g., the vehicle has passed the crosswalk, the vehicle has parked in range of the crosswalk, the vehicle is waiting in a traffic jam in front of the crosswalk, the vehicle is approaching the crosswalk from the side and not crossing it, or the vehicle is approaching the crosswalk from the side and is crossing it, making a turn.

Similarly, the application may include logic for rail crossing beacons and applications in various situations to avoid unnecessary alerts when, e.g., the vehicle has passed the rail crossing, the vehicle has parked in range of the rail crossing, the vehicle is waiting in line in front of the rail crossing, the vehicle is approaching the rail crossing from the side and not crossing it, or the vehicle is approaching the rail crossing from the side and is crossing it, making a turn.

The application may include logic for traffic signal beacons and applications in various situations to avoid unnecessary alerts when, e.g., the vehicle has passed the traffic signal, the vehicle has parked in range of the traffic signal, the vehicle is waiting in line in front of the traffic signal, the vehicle is approaching the traffic signal from the side and not crossing it, the vehicle is approaching the traffic signal from the side and is crossing it, making a turn, the vehicle is on a multi-lane road with many different traffic signals, or the vehicle is on a multi-lane road where an incorrect traffic signal is closer than correct one that applies.

The application may include logic for overhead bridge beacons and applications in various situations to avoid unnecessary alerts when, e.g., the vehicle has passed the overhead bridge, the vehicle has parked in range of the overhead bridge, the vehicle is waiting in a traffic jam in front of the overhead bridge, the vehicle is approaching the overhead bridge from the side and not crossing it, the vehicle is approaching the overhead bridge from the side and is crossing it, making a turn, the vehicle is too high for the overhead bridge, or the vehicle is not too high for the overhead bridge, but the cargo is too high.

The application may include logic for toll booth beacons and applications in various situations to avoid unnecessary alerts when, e.g., the vehicle has passed the toll booth, the vehicle has parked in range of the toll booth, the vehicle is waiting in line in front of the toll booth, the vehicle is passing the toll booth and is required to pay, the vehicle is passing the toll booth and is not required to pay, or the toll booth alert is based on type of vehicle (e.g., size, weight, height, $CO_2$ emissions, etc.).

The application may include logic for other hazard related beacons and applications in various situations to avoid unnecessary alerts when, e.g., the vehicle has passed the hazard, the vehicle has parked in range of the hazard, the vehicle is waiting in line in front of the hazard, the vehicle is passing the hazard in a direction unaffected by the hazard (for example on a parallel road one block away), or the hazard only applies to a certain type of vehicle.

The application may include logic for emergency vehicle (e.g., ambulance, police, military, fire and rescue, hazardous materials, SWAT, bomb disposal, public utility—gas/electricity emergency) related beacons and applications in various situations to avoid unnecessary alerts when, e.g., the vehicle has stopped on the side of the road and is not blocking the EV, the vehicle is parked off the road in a parking lot and not blocking the EV, the vehicle is waiting in a line or traffic jam and is not blocking the EV, the vehicle is driving on a multi-lane road and is not blocking the EV, the vehicle is blocking the EV (One-time alert? Multiple alerts? Continuous alert until minimum range has been achieved?), the EV has passed the vehicle and the vehicle is not blocking the EV any longer, the vehicle is driving on an opposite lane and is not affected by the EV, or the vehicle is driving on a parallel road to the EV one block away.

The application may include logic for determining alert types and behaviors in case of, e.g., police vehicle emergency, ambulance vehicle emergency, fire/rescue vehicle emergency, fire/gas leak/flood/gun shot/bomb threat emergency, traffic jam ahead, car accident ahead, bomb disposal vehicle emergency, terrorist alert emergency, or crime alert emergency.

The application may include logic for road work zones related beacons and applications in various situations to avoid unnecessary alerts when, e.g., the vehicle has passed the road work zone, the vehicle has parked in range of the road work zone, the vehicle is waiting in line in front of the road work zone (e.g., only one direction can pass, switching every 5 minutes), the vehicle is passing the road work zone in a direction unaffected by the road work (for example, on a parallel road or in a direction on a multi-lane road where road work is not done), or the road work zone alert only applies to certain type of vehicles (e.g., vehicles heavier or higher than a set limit may not pass).

The application may include logic for bicycle beacons and applications in various situations to avoid unnecessary alerts when, e.g., the vehicle is approaching a bicycle without a cyclist, the vehicle is passing a bicycle without a cyclist, the vehicle has stopped or parked in range of a bicycle without a cyclist, the vehicle has stopped or parked in range of a moving/passing cyclist, the vehicle is moving in the same direction as a cyclist, the cyclist approaches the moving vehicle on the road, the cyclist approaches the moving vehicle on the road, but is riding in a bicycle lane or on a sidewalk, the cyclist approaches the vehicle from behind a curve, the cyclist is moving in the same direction as the vehicle, but is ahead of the vehicle and behind a curve, or the cyclist is entering or leaving a roundabout with a bicycle nearby.

Accordingly, the present invention may be characterized as a traffic event communication system including a monitor to detect a traffic event; a beacon to transmit a signal when the monitor is activated; an app on a cell phone in a vehicle adapted to receive the transmitted signal; app software on the app adapted to interpret the transmitted signal and determine if the vehicle is generally approaching the transmitted signal location; and audible or visual alarm means on the cell phone to alert the motorist that a traffic event is occurring in the vicinity of the vehicle if the app software determines that the vehicle is generally approaching the transmitted signal location.

The above disclosure is sufficient to enable one of ordinary skill in the art to practice the invention, and provides the best mode of practicing the invention presently contemplated by the inventor. While there is provided herein a full and complete disclosure of the preferred embodiments of this invention, it is not desired to limit the invention to the exact construction, dimensional relationships, and operation shown and described. Various modifications, alternative constructions, changes and equivalents will readily occur to those skilled in the art and may be employed, as suitable, without departing from the true spirit and scope of the invention. Such changes might involve alternative materials, components, structural arrangements, sizes, shapes, forms, functions, operational features or the like.

Therefore, the above description and illustrations should not be construed as limiting the scope of the invention, which is defined by the appended claims.

What is claimed as invention is:

1. A traffic event communication system comprising:

a monitor to detect a traffic event;

a beacon to transmit a signal when said monitor detects a traffic event;

an app on a cell phone in a vehicle adapted to receive the transmitted signal;

app software on said app adapted to interpret the transmitted signal and determine if the vehicle is generally approaching the beacon; and audible or visual alarm means on the cell phone to alert a motorist that a traffic event is occurring in the vicinity of the vehicle if the app software determines that the vehicle is generally approaching the beacon.

2. The traffic event communication system of claim 1 wherein said signal is transmitted via Bluetooth.

3. The traffic event communication system of claim 1 wherein said monitor comprises a switch or sensor to detect the presence of a pedestrian in a crosswalk.

4. The traffic event communication system of claim 1 wherein said monitor comprises a sensor to detect an ice or flood condition in a roadway over which traffic is traveling.

5. A traffic event communication system comprising:

a monitor to detect a traffic event;

a beacon to transmit a signal when said monitor detects a traffic event;

an app on a mobile device in a vehicle adapted to receive the transmitted signal;

app software on said app adapted to interpret the transmitted signal and determine if the vehicle is generally approaching the beacon; and audible or visual alarm means on the mobile device to alert a motorist that a traffic event is occurring in the vicinity of the vehicle if the app software determines that the vehicle is generally approaching the beacon.

6. The traffic event communication system of claim 5 wherein said signal is transmitted via Bluetooth.

7. The traffic event communication system of claim 5 wherein said monitor comprises a switch or sensor to detect the presence of a pedestrian in a crosswalk.

8. The traffic event communication system of claim 5 wherein said monitor comprises a sensor to detect an ice or flood condition in a roadway over which traffic is traveling.

9. The traffic event communication system of claim 5 wherein said beacon is a fixed component.

10. The traffic event communication system of claim 5 wherein said beacon is a mobile component.

\* \* \* \* \*